US010348388B1

(12) United States Patent
Al-Dweik

(10) Patent No.: US 10,348,388 B1
(45) Date of Patent: Jul. 9, 2019

(54) DIRECT DATA DETECTION FOR MIMO COMMUNICATIONS SYSTEMS

(71) Applicant: Khalifa University of Science and Technology, Abu Dhabi (AE)

(72) Inventor: Arafat Al-Dweik, Abu Dhabi (AE)

(73) Assignee: KHALIFA UNIVERSITY OF SCIENCE AND TECHNOLOGY, Abu Dhabi (AE)

( * ) Notice: Subject to any disclaimer, the term of this patent is extended or adjusted under 35 U.S.C. 154(b) by 0 days.

(21) Appl. No.: 15/996,910

(22) Filed: Jun. 4, 2018

Related U.S. Application Data

(60) Provisional application No. 62/664,687, filed on Apr. 30, 2018.

(51) Int. Cl.
*H04B 7/08* (2006.01)
*H04B 7/0413* (2017.01)

(52) U.S. Cl.
CPC ......... *H04B 7/0854* (2013.01); *H04B 7/0413* (2013.01)

(58) Field of Classification Search
CPC ............................ H04B 7/0854; H04B 7/0413
USPC ....................................................... 375/347
See application file for complete search history.

(56) References Cited

U.S. PATENT DOCUMENTS

| 7,756,007 | B2 | 7/2010 | Nicoli |
| 7,986,742 | B2 | 7/2011 | Ketchum et al. |
| 8,451,930 | B2 | 5/2013 | Koike-Akino |
| 8,908,789 | B2 | 12/2014 | Hu et al. |
| 9,596,119 | B2 | 3/2017 | Al-Dweik |
| 9,866,298 | B2 | 1/2018 | Lee et al. |
| 9,900,066 | B2 | 2/2018 | Koo et al. |
| 9,918,328 | B2 | 3/2018 | Tong et al. |
| 9,930,696 | B2 | 3/2018 | Ozluturk |
| 9,935,698 | B1 | 4/2018 | Yang et al. |
| 2010/0067366 | A1 | 3/2010 | Nicoli |
| 2015/0303970 | A1* | 10/2015 | Sahlin ................. H04L 25/0204 375/340 |

(Continued)

OTHER PUBLICATIONS

"LTE; Evolved Universal Terrestrial Radio Access (E-UTRA) and Evolved Universal Terrestrial Radio Access Network (E-UTRAN); Overall description; Stage 2", 3GPP TS 36.300 version 10.7.0 Release 10, ETSI TS 136 300, Mar. 2012, 204 pages.

(Continued)

*Primary Examiner* — Michael R Neff
(74) *Attorney, Agent, or Firm* — Kilpatrick Townsend & Stockton LLP

(57) ABSTRACT

In this work, we present a novel receiving device design for communications systems that incorporates multiple antennas at the transmitting device/receiving device. Unlike existing systems, the new system does not require prior knowledge of the channel state information (CSI) at the receiving device side to extract the information symbols from the received signal. Consequently, complexity reduction and bit error rate improvement can be jointly achieved. Moreover, the new system may offer spectral efficiency enhancement since it does not require nulling to prevent the pilot symbols as in the case of conventional systems. The results obtained show that in certain scenarios the proposed system can offer up to 15 dB of bit error rate improvement over conventional systems. Moreover, the new system can provide about 16.6% of the spectral efficiency improvement.

17 Claims, 13 Drawing Sheets

(56) References Cited

U.S. PATENT DOCUMENTS

| | | | |
|---|---|---|---|
| 2018/0062265 A1* | 3/2018 | Tegreene | H04B 7/0456 |
| 2018/0205152 A1* | 7/2018 | Tegreene | H01Q 9/0442 |

OTHER PUBLICATIONS

"LTE; Evolved Universal Terrestrial Radio Access (E-UTRA); Physical channels and modulation (3GPP TS 36.211 version 10.0.0 Release 10)", ETSI TS 136 211, V10.0.0, Jan. 2011, 105 pages.

"Universal Mobile Telecommunications System (UMTS); Deployment aspects", ETSI TR 125 943, vol. 9, 3GPP TR 25.943 version 9.0.0 Release 9, Feb. 2010, 15 pages.

Dean et al., "Blind Joint MIMO Channel Estimation and Decoding", IEEE Global Communications Conference, Dec. 2017, 6 pages.

Gao et al., "Robust Subspace Blind Channel Estimation for Cyclic Prefixed MIMO OFDM Systems: Algorithm, Identifiability and Performance Analysis", IEEE Journal on Selected Areas in Communications, vol. 26, No. 2, Feb. 2008, pp. 378-388.

Hampton, "Introduction to MIMO Communications", Cambridge University Press, 2013, 304 pages.

Luo et al., "Integrated MAP Detection for V-BLAST Systems without Channel Estimation", IEEE Transactions on Wireless Communications, vol. 8, No. 7, Jul. 2009, pp. 3590-3596.

Lv et al., "Semi-Blind Channel Estimation Relying on Optimum Pilots Designed for Multi-Cell Large-Scale MIMO Systems", IEEE Access, vol. 4, Mar. 17, 2016, pp. 1190-1204.

Ma et al., "Design and Optimization on Training Sequence for mmWave Communications: A New Approach for Sparse Channel Estimation in Massive MIMO", IEEE Journal on Selected Areas in Communications, vol. 35, No. 7, Jul. 2017, pp. 1486-1497.

Mishra et al., "SBL-Based Joint Sparse Channel Estimation and Maximum Likelihood Symbol Detection in OSTBC MIMO-OFDM Systems", IEEE Transactions on Vehicular Technology, vol. 67, No. 5, May 5, 2018, pp. 4220-4232.

Nayebi et al., "Semi-blind Channel Estimation for Multiuser Massive MIMO Systems", IEEE Transactions on Signal Processing, vol. 66, No. 2, Jan. 15, 2018, pp. 540-553.

Rezk et al., "On High Performance MIMO Communications with Imperfect Channel Knowledge", IEEE Transactions on Wireless Communications, vol. 10, No. 2, Feb. 2011, pp. 602-613.

Saci et al., "One-Shot Blind Channel Estimation for OFDM Systems Over Frequency-Selective Fading Channels", IEEE Transactions on Communications, vol. 65, No. 12, Dec. 2017, pp. 5445-5458.

Tu et al., "Subspace-Based Blind Channel Estimation for MIMO-OFDM Systems With Reduced Time Averaging", IEEE Transactions on Vehicular Technology, vol. 59, No. 3, Mar. 2010, pp. 1539-1544.

Wu et al., "Analysis of DFT-Based Channel Estimation for Uplink Massive MIMO Systems", IEEE Communications Letters, vol. 22, No. 2, Feb. 2018, pp. 328-331.

Wu et al., "Channel Estimation for mmWave MIMO With Transmitter Hardware Impairments", IEEE Communications Letters, vol. 22, No. 2, Feb. 2018, pp. 320-323.

Wu et al., "Message-Passing Receiver for Joint Channel Estimation and Decoding in 3D Massive MIMO-OFDM Systems", IEEE Transactions on Wireless Communications, vol. 15, No. 12, Dec. 2016, pp. 8122-8138.

Zhang et al., "Blind Channel Estimation for MIMO-OFDM Systems with Low Order Signal Constellation", IEEE Communications Letters, vol. 19, No. 3, Mar. 2015, pp. 499-502.

Zhang et al., "On Superimposed Pilot for Channel Estimation in Multicell Multiuser MIMO Uplink: Large System Analysis", IEEE Transactions on Vehicular Technology, vol. 65, No. 3, Mar. 2016, pp. 1492-1505.

* cited by examiner

DIRECT DATA DETECTION FOR MIMO COMMUNICATIONS SYSTEMS

CROSS-REFERENCES TO RELATED APPLICATIONS

The present application is a non-provisional application of and claims priority to U.S. Provisional Application No. 62/664,687 filed on Apr. 30, 2018, the entire contents of which are herein incorporated by reference for all purposes.

FIELD OF THE DISCLOSURE

The disclosure relates to communication systems and more particularly to a computer-implemented method, system, and channel estimator/signal detector (in a receiver device) for exacting symbols from a transmitted signal within a communication system, and particularly a Multiple Input Multiple Output (MIMO) communication system.

BACKGROUND

Wireless communication systems transmit and receive data signals within some spectrum of electromagnetic frequencies. As the demand for wireless communication continues to grow, there are a number of challenges inherent in improving the efficiency of the usage of a spectrum, as the capacity of that spectrum is limited. To this end, a number of wireless communication techniques have been proposed. One such system is Multiple-Input Multiple-Output (MIMO), which refers to a class of wireless communication systems that use techniques for sending and receiving more than one data signal simultaneously over the same radio channel. In some embodiments, a MIMO system may include multiple antennas at the transmitting device, receiving device, or both. MIMO techniques improve communications performance by either combating or exploiting multipath scattering in the communications channel between a transmitting device and receiving device. A MIMO system may combat multipath fading by creating what is called spatial diversity, or it may exploit multipath propagation by performing spatial multiplexing. MIMO systems are included in most wireless communications commercial standards including IEEE 802.11n (WiFi), IEEE 802.16e (Wi-MAX), LTE (3.9G), LTE-Advanced (4G), 802.11 ac (Enhanced WiFi).

Typically, signals transmitted from a transmitter device to a receiver device may be distorted by noise. In order to account for this noise, in conventional MIMO systems, extracting the information at the receiving device side typically requires knowledge of, or at least an estimate of, the channel information between all antennas at both the transmitting device and the receiving device. This channel information is typically represented by a matrix H. In most existing systems, the information detection process in MIMO communications systems is performed by estimating the channel matrix $\hat{H}$, and using it to equalize received data symbols. A maximum likelihood detection (MLD) is then applied in order to extract the information symbols from the received signals. The matrix H is inverted and multiplied by the received signal. And finally, the product outcome is fed to a detector to recreate the information symbols. However, the processes performed by these conventional systems suffer from a number of problems. For example: accurate estimation of the channel matrix $\hat{H}$ at the receiving device is a complex process, and it may affect the spectral efficiency of the overall system; the inversion of the estimated channel matrix $\hat{H}^{\wedge\wedge}$ is computationally costly, particularly for large number of transmitting antennas; multiplying the inverse of $\hat{H}$, denoted as $[\hat{H}]^{-1}$, by the received signal (equalization), and then using maximum likelihood detectors to extract the information symbols is also computationally costly; and imperfect estimation of H may cause severe performance degradation.

Embodiments of the invention address these and other problems, individually and collectively.

BRIEF SUMMARY

Embodiments of the disclosure are directed to novel systems in which information symbols are detected directly using one or more novel techniques which do not require channel matrix estimation or inversion. Moreover, no equalization or maximum likelihood detection is involved in embodiments of the disclosure. Consequently, significant complexity reduction and error performance enhancement can be achieved through the use of embodiments disclosed herein.

One embodiment of the invention is directed to a method for exacting information from a noisy multiple-input multiple-output (MIMO) wireless communication channel, the method comprising receiving, with one or more antennas, successive blocks of received signals encoded with a frequency space-time code, each block of received signals corresponding to a transmitted block of information symbols and perturbed by noise, jointly estimating successive blocks of information symbols at least in part by minimizing a magnitude of a matrix norm of a difference between a first matrix product and a second matrix product, the first matrix product corresponding to a product between a matrix representing a block of the received signals and an inverse of a corresponding block of the information symbols, the second matrix product corresponding to a product between a matrix representing a successive block of the received signals and an inverse of a corresponding successive block of the information symbols, and providing the estimated successive blocks of information symbols to a consumer of information symbols.

Another embodiment of the invention is directed to a method for exacting information from a noisy multiple-input multiple-output (MIMO) wireless communication channel, the method comprising receiving, with one or more antennas, successive blocks of received signals encoded with a frequency space-time code, each block of received signals corresponding to a transmitted block of information symbols and perturbed by noise, jointly estimating successive blocks of information symbols at least in part by minimizing a sum of a magnitude of a matrix determinant of a difference between a first matrix and a second matrix, the first matrix based on a matrix representing a block of the received signals and an inverse of a corresponding block of the information symbols, the second matrix based on a matrix presenting a successive block of the received signals and an inverse of a corresponding successive block of the information symbols, and providing the estimated successive blocks of information symbols to a consumer of information symbols.

Another embodiment of the invention is directed to a receiving device comprising one or more antennas, and a signal detector for exacting information from a noisy multiple-input multiple-output (MIMO) wireless communication channel, the signal detector being adapted to receive, via the one or more antennas, successive blocks of received signals encoded with a frequency space-time code, each block of received signals corresponding to a transmitted block of information symbols and perturbed by noise, determine a first matrix based on a matrix representing a block of the received signals and an inverse of a corresponding block of the information symbols, determine a second matrix based on a matrix presenting a successive block of the received signals and an inverse of a corresponding successive block of the information symbols, estimate successive blocks of information symbols based at least in part on a difference between the determined first matrix and the determined second matrix, and provide the estimated successive blocks of information symbols to a second device.

BRIEF DESCRIPTION OF THE DRAWINGS

Various embodiments in accordance with the present disclosure will be described with reference to the drawings, in which.

DETAILED DESCRIPTION

Figure 1:
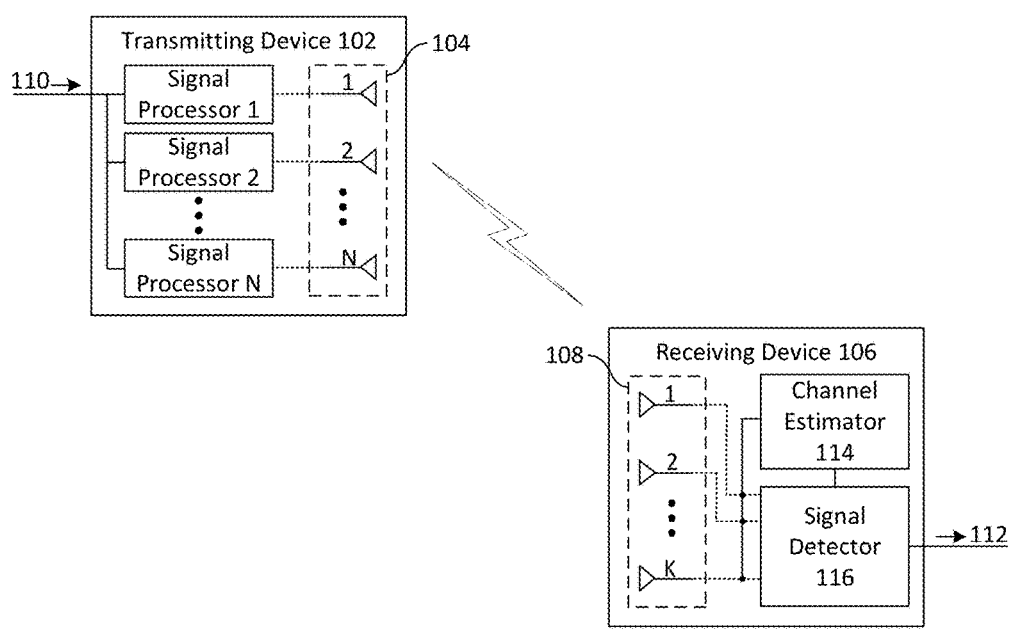
FIG. 1 depicts an illustrative MIMO wireless communication system in which a transmitting device having a first antenna array communicates with receiving device having a second antenna array.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to systems, methods, apparatuses, and computer readable media for providing a system and method in which information symbols are detected directly using a novel technique which does not require channel matrix estimation or inversion. Moreover, embodiments of the system do not require the use of equalization or maximum likelihood detection. Consequently, significant complexity reduction and error performance enhancement can be achieved via the use of embodiments of the disclosure. In some embodiments of the disclosed system, pilot symbols may be used to assist in the information symbols extraction process, which are also used in most international standards for communications systems. However, the disclosed system is more flexible than conventional systems as the disclosed system has high flexibility regarding the number of nulled symbols, which can enhance the spectral efficiency of the system overall.

In most existing systems, the information detection process in MIMO communications systems is performed by estimating the channel matrix H, and using it to equalize the received data symbols. Maximum likelihood detection (MLD) is then applied to extract the information symbols. Therefore, the channel estimation process is one of the most critical processes in these systems since it impacts the extraction of information symbols from the received signals. The estimation of the channel matrix H also determines the reliability, complexity, and the spectral efficiency of these existing MIMO systems.

The issue of information symbols' detection in MIMO communications systems has been widely addressed in various literature. However, the approaches followed by most conventional systems is generally directed toward channel matrix estimation and equalization using the zero forcing (ZF) or minimum mean square error (MMSE) criteria, where the knowledge of the channel matrix H is required to perform coherent detection at the receiving device side. Since H is typically unknown at the receiving device, it has to be estimated using certain estimation methods, and then used to extract the information symbols. However, there has been very little work on extracting information symbols in MIMO systems coherently without the knowledge of H. A novel algorithm has been developed which has been described in U.S. Pat. No. 9,596,119 entitled "SIGNAL DETECTION IN A COMMUNICATION SYSTEM" to Al-Dweik. That application is directed to techniques for extracting information symbols directly from a received signal without the knowledge of the channel state information $\{H_1, H_2, \ldots\}$, and without equalization or MLD. The approach reported in that patent involves extracting data symbols by exploiting the correlation of the channel over consecutive time slots. The system of that patent demonstrated superior error rate performance over conventional systems. However, the system of that patent works only for single-input single-output systems.

A direct data detection scheme for MIMO systems is described in the current disclosure. Embodiments of the disclosure provide an integration of channel estimation and signal detection under the maximum a posteriori (MAP) criterion. The proposed MAP detector avoids the impact of channel estimation errors and can generate more accurate estimates of the transmitted data. However, the MAP based system has major drawbacks as it requires very long frame to accurately compute the mean and variances of all symbols. Moreover, the channel is assumed to be flat for the entire frame period, and the complexity of the system is considerably high. In the system described herein, the information symbols will be detected directly using a novel technique where no channel matrix estimation or inversion is required. Moreover, no equalization or maximum likelihood detection is involved. Consequently, significant complexity reduction and error performance enhancement can be achieved by use of embodiments described herein. It should be noted that, for the purposes of the current disclosure, vectors are generally represented by bold lower case letters and matrices are generally represented by bold capital letters.

Embodiments of the disclosure provide for a number of technical advantages over conventional systems. For example, unlike conventional systems, embodiments of the disclosed system do not require prior knowledge of the channel state information (CSI) at the receiving device side to extract the information symbols from the received signal. Consequently, complexity reduction and bit error rate improvement can be jointly achieved. Moreover, the disclosed system may provide an improvement in spectral efficiency since the system does not require nulling to prevent the pilot symbols contamination as in the case of conventional systems. The results obtained show that in certain scenarios, the disclosed system can offer up to 15 dB of bit error rate improvement over conventional systems. Moreover, in certain scenarios an improvement in spectral efficiency of up to 16.6% may be achieved.

FIG. 1 depicts an illustrative MIMO wireless communication system 100 in which a transmitting device 102 having a first antenna array 104 communicates with receiving device 106 having a second antenna array 108. In some embodiments, the transmitting device 102 may be configured to receive a message from some source 110. The receiving device 106 may be configured to provide that message to some receiving entity 112.

In operation, the transmitting device 102 transmits a signal through one or more antennas in the array of antennas 106 and over a channel to a receiving device 104, which combines the received signal from one or more antennas in antenna array 108 to reconstruct the transmitted data. To transmit a signal, the transmitting device 102 prepares a transmission signal, represented by a vector, for the signal. The transmission signal vector is transmitted via a channel represented by a matrix H, and is received at the receiving device 104 as a received signal vector. The channel matrix H represents a channel gain between the transmitting device antenna array 106 and the receiving device antenna array 108. Thus, the channel matrix H can be represented by a K×N matrix of complex coefficients, where N is the number of antennas in the transmitting device antenna array 106 and K is the number of antennas in the receiving device antenna array 108. The value of K can be unique for each receiving device. As will be appreciated, the channel matrix H can instead be represented by a N×K matrix of complex coefficients, in which case the matrix manipulation algorithms are adjusted accordingly so that, for example, the right singular vector calculation on a K×N channel matrix becomes a left singular vector calculation on a N×K channel matrix.

In order to transmit information using a MIMO communication schema, the transmitting device may include a number of signal processors (1-N) each of which may be associated with an antenna of the antenna array 104. In some embodiments, each signal processor of the signal processors 1-N may independently process at least a portion of the signal received from source 110.

In situations where channel conditions are unstable or unknown, open loop MIMO techniques, such as spatial multiplexing, can be used. In such situations, the distortion or noise in a communication may depend, at least in part, on the transmission characteristics of the medium through which a signal is transmitted (e.g., air or some other substance). A variety of methods may be used at the receiving device to reduce or offset that noise. In some embodiments, the system may involve the transmitting device transmitting a known pilot signal to a receiving device so that the receiving device, knowing the pilot signal that it received, can offset the noise of the communication. Using pilot signals in conventional MIMO systems may deteriorate the spectral efficiency of those systems in several ways. For example, the pilot signals themselves may not carry information. As another example, when a pilot signals is transmitted, all other transmit antennas are typically not allowed to use the channel in conventional systems.

The communication system 100 may be any type of wireless communication system, including but not limited to, a MIMO system. In the communication system 100, the transmitting device 102 may act as a base station, while the receiving device 106 acts as a subscriber station, which can be any suitable type of wireless one-way or two-way communication device such as a cellular telephone, wireless equipped computer system, and wireless personal digital assistant. In some embodiments, the receiving device 106 can also transmit signals which are received by the transmitting device 102. The signals communicated between the transmitting device 102 and the receiving device 106 can include audio data, text data, image/video data, and/or any other suitable data type.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
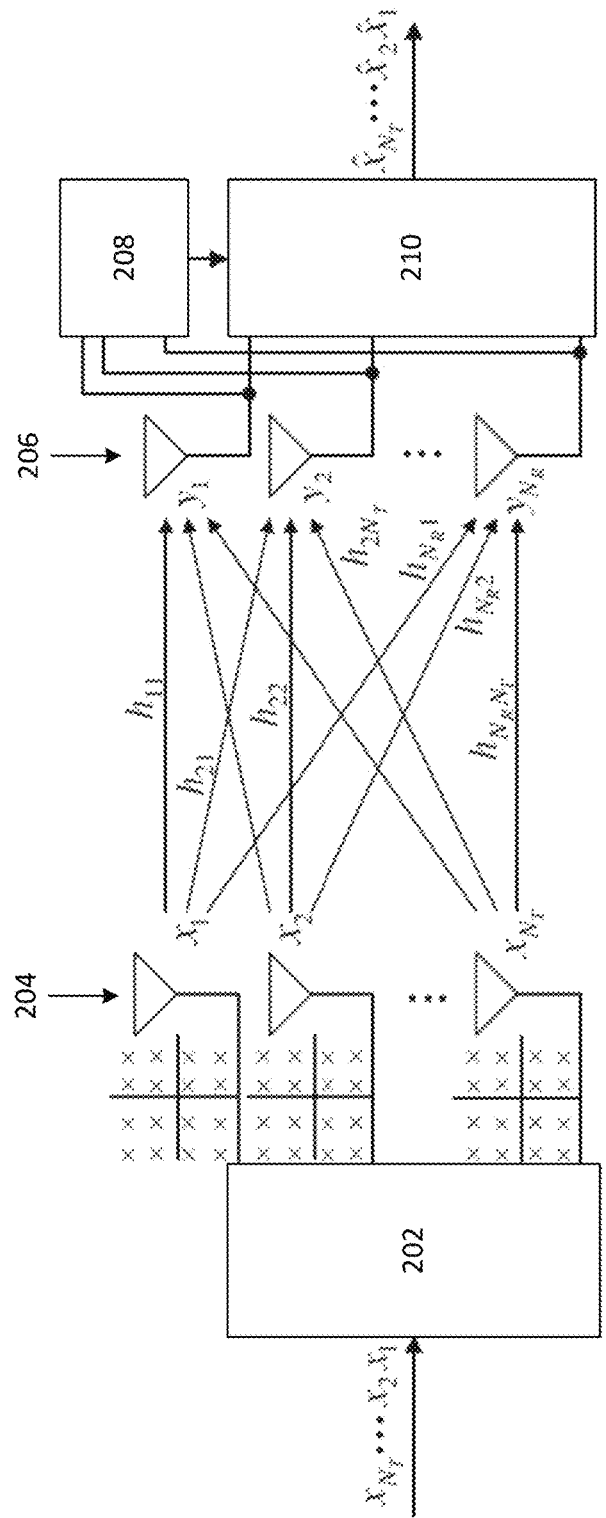
FIG. 2 depicts a block diagram illustrating interactions between components of a MIMO system.

FIG. 2 depicts a block diagram illustrating interactions between components of a MIMO system. In FIG. 2, a transmitting device is depicted as including a spatial stream generator 202, which may include a number of signal processors as depicted in FIG. 1, and multiple antennas 204. In FIG. 2, a receiving device is depicted as including multiple antennas 206 as well as a channel estimator 208 and a signal detector 210. Channel estimator 208 and signal detector 210 may be examples of channel estimator 114 and signal detector 116 depicted in FIG. 1 respectively. It should be noted that although the channel estimator 208 and signal detector 210 are depicted as separate entities, the two may be implemented as a single entity in some embodiments.

Consider a $N_R \times N_T$ MIMO system where $N_R$ is the number of antennas 206 at the receiving device and $N_T$ is the number of antennas 204 at the transmitting device, as shown in FIG. 2. As depicted, each of the antennas 204 may receive signals affected by each of the antennas 206, such that the received signal of the $N_R \times N_T$ MIMO system can be expressed as:

$$r = Hx + z \quad (1)$$

where r is the received signal vector that can be represented as $r=[r_1, r_2, \ldots, r_{N_R}]^T$ and the transmitted data vector $x=[x_1, x_2, \ldots, N_T]^T$, the notation $(\cdot)^T$ denotes the transpose operation. Each of the information symbols in x is selected uniformly from an arbitrary constellation set $\mathcal{X}$ with modulation order M, and is transmitted form one of the $N_T$ antennas 204. The channel matrix is denoted as $H \in \mathbb{C}^{NR \times NT}$ and its elements $z \sim \mathcal{CN}(0,\sigma_H^2)$ represent the channel frequency response (CFR) between the $i^{th}$ receiving and $j^{th}$ transmitting antennas, and z is an additive white Gaussian noise (AWGN) vector, $z=[z_1, z_2, \ldots, z_{NR}]$ the elements of z are independent and identically distributed (iid) random variables where $z_i \sim \mathcal{CN}(0,\sigma_z^2)$.

As can be derived from the above relationship, the received signal at the $i^{th}$ receiving antenna can be expressed as:

$$r_i = \sum_{j=1}^{N_T} H_{j,i} x_j + z_i \qquad (2)$$

Therefore, each of the $j^{th}$ transmitted information symbols will be contaminated by the other j−1 information symbols. In order to detect the symbols, linear detection methods can be invoked to equalize the symbols and eliminate or reduce the interference caused by the other $N_T-1$ transmitted signals. The data symbols vector x can represent the data symbols of single or multicarrier systems. Because orthogonal frequency division multiplexing (OFDM) is widely considered in most standards for wireless communications, it will be adopted for the purposes of this disclosure, and it can be applied to single carrier systems using the same approach. However, it should be noted that one skilled in the art would recognize that other suitable techniques are available, each of which should be considered an equivalent.

In several communications systems applications, computational complexity is considered as a key design parameter, in that those communication systems may seek to increase efficiency by reducing computational complexity. As a result of this, linear equalizers are typically conventionally used to eliminate and/or reduce noise and extract information symbols in MIMO systems. Two commonly used equalizers are the zero-forcing equalizer and minimum mean square error (MMSE) equalizer. The drawbacks for each of these techniques are discussed below.

A zero-forcing equalizer eliminates the interference from interfering signals using the Moore-Penrose pseudo inverse weighting matrix W such that:

$$W = (H^H H)^{-1} H^H \qquad (3)$$

Therefore, the equalized symbols can be expressed as:

$$s = Wr \qquad (4)$$
$$= W(Hx + z)$$
$$= (H^H H)^{-1} H^H (Hx + z)$$
$$= x + (H^H H)^{-1} H^H z$$
$$= x + n$$

where $n=(H^H H)^{-1} H^H z$.

Once the equalized vector s is obtained, its symbols are applied to a maximum likelihood detector (MLD) to generate an estimated version of the transmitted information symbols, $$\hat{x}_j = \underset{\tilde{x} \in \mathcal{X}}{\arg\min} |s_j - \tilde{x}_j|^2 \qquad (5)$$

where $\mathcal{X}$ represents the set of all possible values that the modulated symbol $x_j$ may take.

Although performing a zero-forcing equalization can eliminate signal interference (e.g., noise), it should be noted that zero-forcing equalization suffers from some critical limitations. First, the equalization process requires the knowledge of, or at least an accurate estimate of, an estimated channel matrix (denoted as H), which would need to be obtained using certain estimation methods which are computationally expensive. Second, severe performance degradation might occur because the zero-forcing equalization process involves performing a matrix inversion process. In the case that the determinant of the matrix $H^H H$ is small, dividing z by $\det(H^H H)$ would amplify the noise values with respect to the original signal value (i.e., it will degrade the signal to noise ratio (SNR)). This makes performing a zero-forcing equalization process less than ideal in a number of situations.

A minimum mean square error equalizer maximizes the signal to interference and noise ratio (SINR). In a minimum mean square error, a weighting matrix W is given by:

$$W = (H^H H + \sigma_z^2 I)^{-1} H^H. \qquad (6)$$

where I is the $N_T \times N_T$ identity matrix. As it can be noted from the above equation, the minimum mean square error equalizer requires the knowledge of the noise variance $\sigma_z^2$. Then, the equalized symbols can be written as:

$$s = Wr \qquad (7)$$
$$= ((H^H H + \sigma_z^2 I)^{-1} H^H)(Hx + z)$$
$$= x + \xi + n$$

where $\xi$ is the interference and $n=(H^H H+\sigma_z^2 I)^{-1} H^H)z$. Note that the interference term $\xi$ was introduced because $((H^H H+\sigma_z^2 I)^{-1} H^H)H \neq I$. Once the equalized symbols $s=[s_1, s_2, \ldots, s_{N_T}]$ are obtained, they can be applied to the maximum likelihood detector. It should be noted that while the minimum mean square error equalizer reduces the noise amplification phenomenon, which has a greater impact than on error performance of the system. As would be recognized by one skilled in the art, the above is computationally expensive. Accordingly, the use of a minimum mean square error equalizer is less than ideal in a number of situations As should be noted by the equations for each of the equalizers described above, those equalizers typically require that the detection matrix W be known at the receiving device in order to compute the decision variables vector s and the estimated data vector x. In most MIMO systems, the estimated detection matrix W can be obtained by transmitting known reference signals, denoted as pilots, which are then used at the receiving device to compute W, thus, s=Wr. The pilot symbols are typically distributed in time-frequency grid based on the channel characteristics of the considered application. Some examples of time frequency grids are depicted in FIG. 3, described below.

Figure 3:
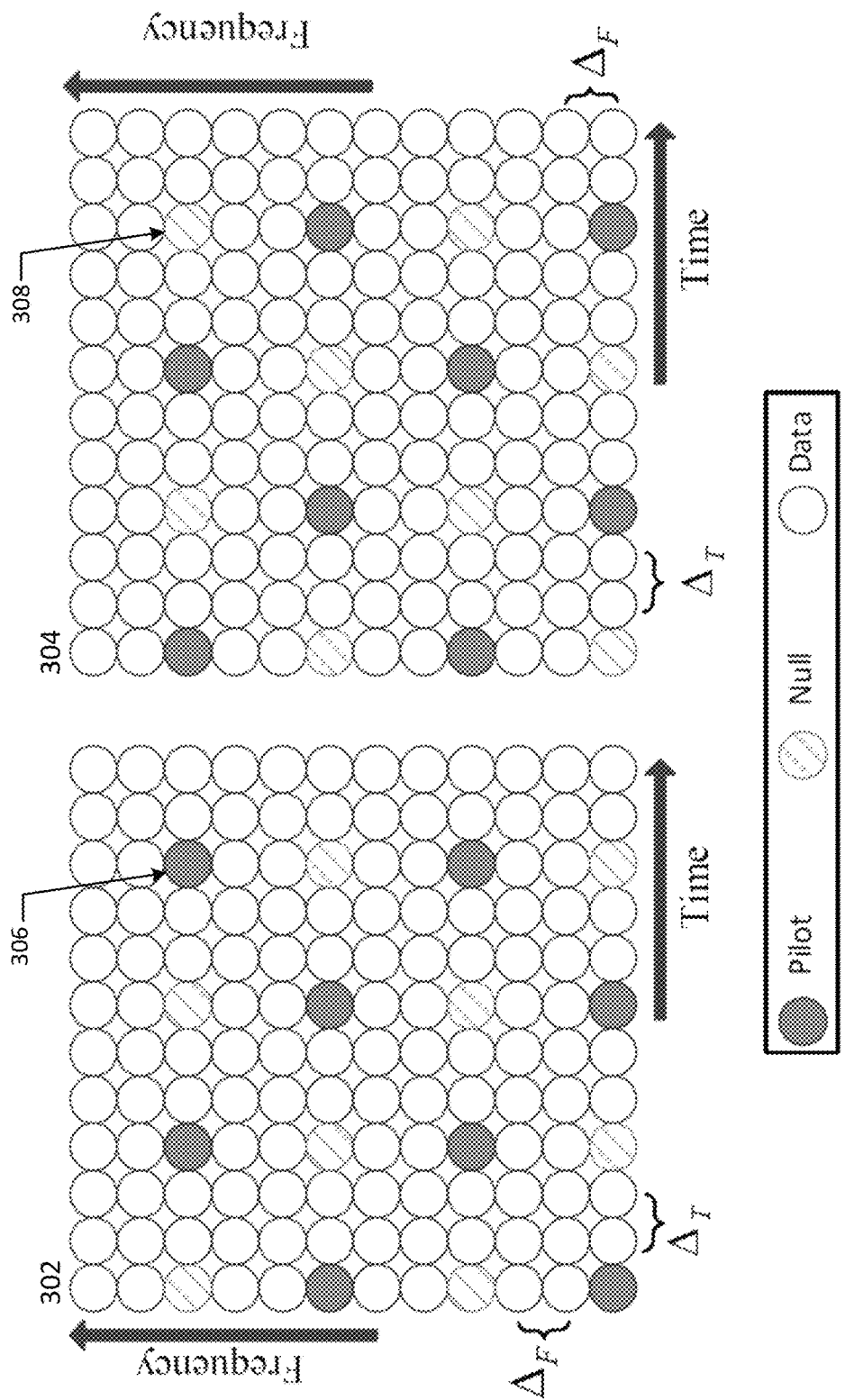
FIG. 3 depicts some example time-frequency grids in accordance with MIMO communication systems.

FIG. 3 depicts some example time-frequency grids in accordance with MIMO communication systems. In FIG. 3, the left side FIG. 302 represents a first antenna and the right side FIG. 304 represents a second antenna. In this example, when a pilot symbol 306 is transmitted from a particular antenna, all other antennas are muted (e.g., see 308), nothing is transmitted, to make sure that the pilot symbol for that antenna is not contaminated by interference from other antennas.

Given that antenna j transmitted a pilot symbol P, the received signal at receiving device i can be expressed as:

$$r_i = H_{i,j} P_j + z_i. \quad (8)$$

Then, least squared estimation (LSE) can be used such that $$\hat{H}_{i,j} = \frac{r_i}{P_j} = H_{i,i} + \frac{z_i}{P_j}. \quad (9)$$

Once the channel estimate are obtained at the pilot location, various interpolation techniques can be used to compute the channels' coefficients at all other data symbols. Using the pilot signals in this example MIMO system may deteriorate the spectral efficiency of the system in several ways. For example, the pilot symbols themselves may not carry information. As another example, when a pilot symbol is transmitted, all other transmit antennas are typically muted (i.e., they are not allowed to use the channel).

As can be discerned from the description above, there are numerous inefficiencies in the performance of conventional MIMO communication systems. Described below is a novel technique for extracting information signals from a transmission without the need to determine a channel matrix H. In particular, described below is a direct data detection (D3) system. For the purposes of the following, consider a N×N MIMO system configured following the V-BLAST configuration. Therefore, the received signal at the $i^{th}$ receiving antenna during the $l^{th}$ signaling period can be written as:

$$r_i^{(l)} = H_{i,1}^{(l)} x_1^{(l)} + H_{i,2}^{(l)} x_2^{(l)} + H_{i,3}^{(l)} x_3^{(l)} + \ldots + H_{i,N}^{(l)} x_N^{(l)} + z_i \quad (10)$$

In matrix notation, the received signals for the N antennas for the first signaling period is given by:

$$r^{(1)} = \begin{bmatrix} H_{1,1}^{(1)} & H_{1,2}^{(1)} & \ldots & H_{1,N}^{(1)} \\ H_{2,1}^{(1)} & H_{2,2}^{(1)} & \ldots & H_{2,N}^{(1)} \\ \vdots & \vdots & \ddots & \vdots \\ H_{N,1}^{(1)} & H_{N,2}^{(1)} & \ldots & H_{N,N}^{(1)} \end{bmatrix} \begin{bmatrix} x_1^{(1)} \\ x_2^{(1)} \\ \vdots \\ x_N^{(1)} \end{bmatrix} + \begin{bmatrix} z_1^{(1)} \\ z_2^{(1)} \\ \vdots \\ z_N^{(1)} \end{bmatrix}. \quad (11)$$

Buffering the signals for L≥N signaling periods gives $$R^{(1)} = [r^{(1)} \ r^{(2)} \ \ldots \ r^{(L)}] \quad (12)$$

$$[H^{(1)} x^{(1)} \ H^{(2)} x^{(2)} \ \ldots \ H^{(L)} x^{(L)}] + Z^{(1)}$$

Where $Z^{(1)} \in \mathbb{C}^{N \times L}$ AWGN matrix. In slow and block fading channels, it can be assumed that $H^{(1)} \approx H^{(2)} \approx \ldots \approx H^{(L)} = \mathcal{H}^{(1)}$. Therefore, $$R^{(1)} = \mathcal{H}^{(1)} [x^{(1)} \ x^{(2)} \ \ldots \ x^{(L)}] \quad (13)$$

$$= \mathcal{H}^{(1)} X^{(1)} + Z^{(1)}$$

If we repeat the same process for another block of L signaling periods we obtain $$R^{(2)} = \mathcal{H}^{(2)} [x^{(L+1)} \ x^{(L+2)} \ \ldots \ x^{(2L)}] \quad (14)$$

$$= \mathcal{H}^{(2)} X^{(2)} + Z^{(2)}.$$

Therefore, the lth received block can be expressed as $$R^{(l)} = \mathcal{H}^{(l)} X^{(l)} + Z^{(l)}.$$

where $X^l$ is a corresponding block of transmitted symbols and $Z^l$ represents noise perturbation during the block.

In slow fading channels, the matrices $\mathcal{H}^{(l)}$ and $\mathcal{H}^{(l+1)}$ are highly correlated, and it can be actually assumed that $\mathcal{H}^{(l)} = \mathcal{H}^{(l+1)}$ which (given that $X^{(l)}$ and $X^{(l+1)}$ are invertible matrices) implies that:

$$\mathcal{H}^{(l)} X^{(l)} \times [X^{(l)}]^{-1} - \mathcal{H}^{(l+1)} X^{(l+1)} \times [X^{(l+1)}]^{-1} \approx 0_{N \times N} \quad (15)$$

Therefore, the information matrices $X^{(l)}$ and $X^{(l+1)}$ can be jointly estimated by minimizing the following objective function:

$$[\hat{X}^{(l)}, \hat{X}^{(l+1)}] = \arg \min_{[\tilde{X}^{(l)}, \tilde{X}^{(l+1)}]} \left\| R^{(l)} \times [\tilde{X}^{(l)}]^{-1} - R^{(l+1)} \times [\tilde{X}^{(l+1)}]^{-1} \right\|^2 \quad (16)$$

$$= \arg \min_{[\tilde{X}^{(l)}, \tilde{X}^{(l+1)}]} \sum_{i=1}^{N} \sum_{j=1}^{N} |Q^{(l)}(i,j) - Q^{(l+1)}(i,j)|^2$$

where $\tilde{X}$ is a matrix composed of all trial values of the transmitted symbols $x_j \in \mathcal{X}$ and $Q = R \tilde{X}^{-1}$. If the matrices $X^{(l)}$ and $X^{(l+1)}$ are non-squared matrices, the Moore-Penrose pseudo inverse can be used. The objective function above can be generalized for K received blocks such that:

$$[\hat{X}^{(1)}, \ldots, \hat{X}^{(K)}] = \quad (17)$$

$$\arg \min_{[\tilde{X}(l), \tilde{X}(K)]} \sum_{l=1}^{K-1} \left\| R^{(l)} \times [\tilde{X}^{(l)}]^{-1} - R^{(l+1)} \times [\tilde{X}^{(l+1)}]^{-1} \right\|^2$$

However, the objective function above may not have a unique solution for all possible values of $X^{(l)}$ and $X^{(l+1)}$. Moreover, matrix X might be singular, as in the case where all the entries of the trial matrix are equal, and hence the above will have no solution. To resolve this problem, we recall that most commercial standards such as LTE-A use pilots for channel estimation. Therefore, the pilot symbols can be exploited to resolve this problem by simply choosing the pilot symbol Pj such that $Pj \notin \mathcal{X}$ (where $\mathcal{X}$ is an alphabet of available symbols). Other solutions are possible as well by making the symbol alphabet $\mathcal{X}$ change as a function of signaling period.

By implementing the above, a receiving device can be configured to extract symbols from a received transmission without estimating a channel matrix H. The receiver need only compare received signal blocks in order to extract those symbols. In some embodiments, a channel estimator and/or signal detector (e.g., channel estimator 114 and signal detector 116 depicted in FIG. 1) may be modified to perform the functions described above, resulting in a channel estimator which is more efficient than conventional channel estimators.

Figure 4:
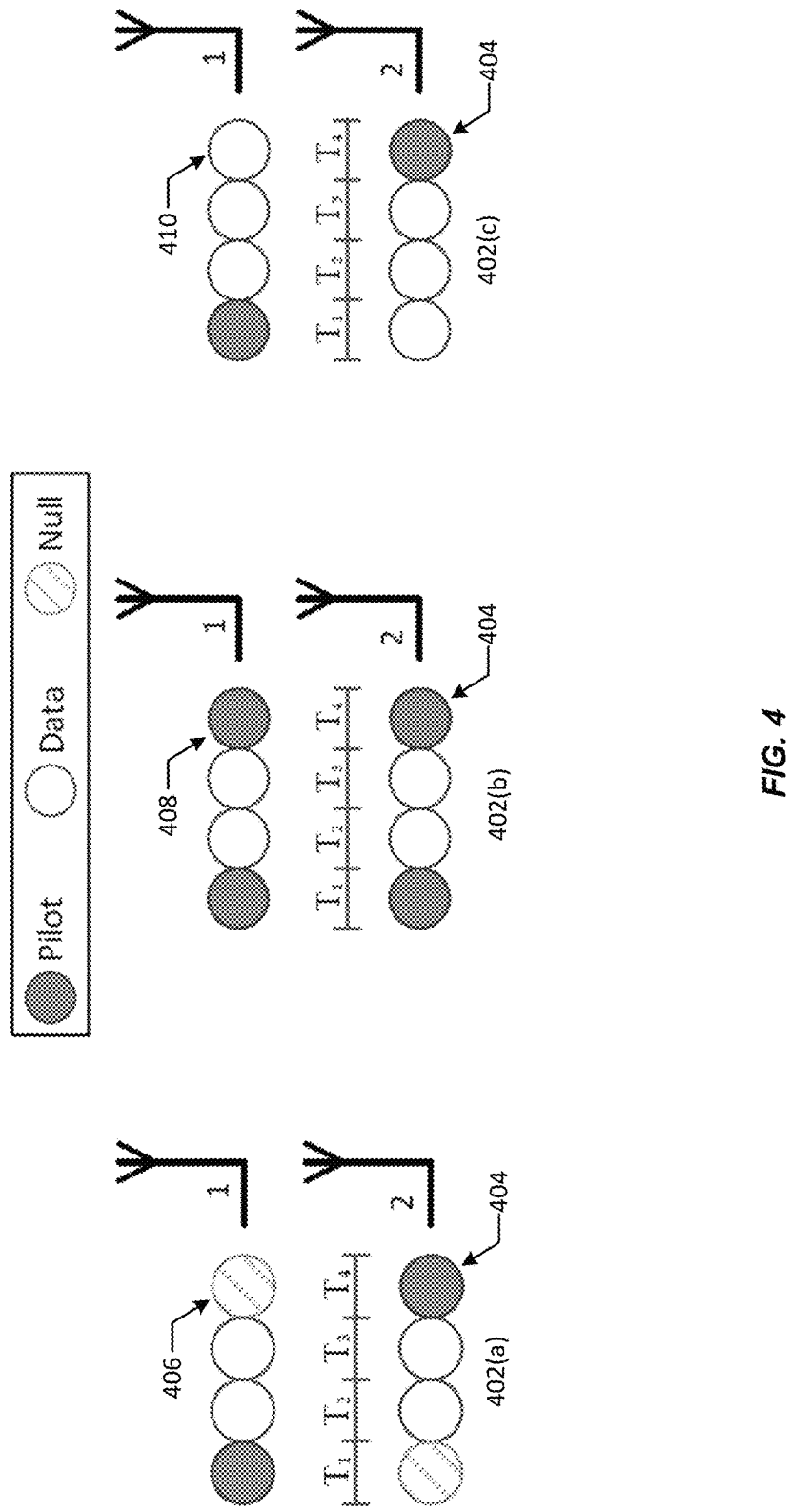
FIG. 4 depicts three transmitting device block diagrams, each of which illustrate a separate scenario over four symbol periods.

FIG. 4 depicts three transmitting device block diagrams, each of which illustrate a separate scenario over four symbol periods. For the purposes of FIG. 4, consider implementation on a 2×2 Vertical Bell Laboratories Layer Space-time (V-BLAST) with binary phase shift keying (BPSK) modulation, $x_i \in \{1, -1\}$. The adopted pilot mapping follows the LTE-A standard shown in FIG. 3, however only one of the subcarriers is considered. Each of 402(a), 402(b), and 402(c) shows the transmitting device block diagram over four symbol periods. The block diagram for 402(a) is consistent with current implementations, in which a pilot signal 404 is transmitted and other antennas 406 are muted during that transmission. It should be noted that, because conventional systems require estimation of a channel matrix (as pointed out above), the antennas 406 are typically muted in order to prevent interference of the pilot signal 404 by those antennas 406.

It should be noted that, in the proposed system there is no need for null symbols (as there is no need for calculation of a channel matrix). Therefore, the null symbols can be replaced by a pilot symbol 408 as shown in FIG. 402(b), or by a regular data symbol 410 as shown in FIG. 402(c). As it can be noted from the figure, options 402(a) and 402(b) have the same spectral efficiency, but option 402(c) has better spectral efficiency since it results in the transmission of more data within the same period of time. For these examples, the total power allocated to the pilot symbols should be equal.

Based on the considered model, each of the four time slots $T_1 \ldots T_4$ as a channel matrix that can be expressed as:

$$H^{(t)} = \begin{bmatrix} H_{1,1}^{(t)} & H_{1,2}^{(t)} \\ H_{2,1}^{(t)} & H_{2,2}^{(t)} \end{bmatrix}, t \in \{1, \ldots, 4\}$$

Figure 5:
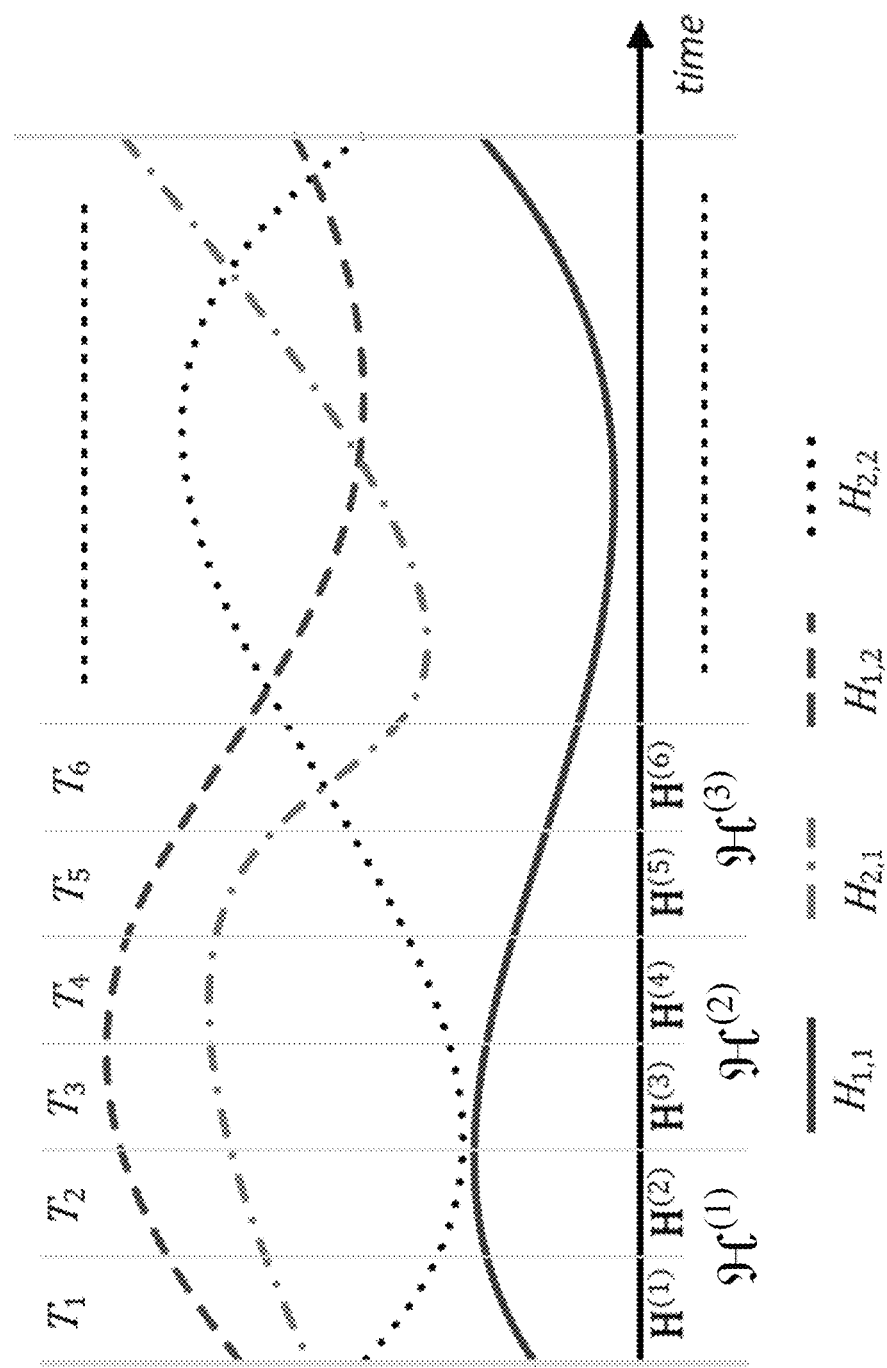
FIG. 5 depicts an example of a 2×2 time-varying MIMO channel.

And because there are only four time slots, the corresponding four received blocks can be split into two parts as depicted in FIG. 5 below.

FIG. 5 depicts an example of a 2×2 time-varying MIMO channel. In FIG. 5, the time slots $T_1, T_2, \ldots$ etc. correspond to symbol periods. For the purposes of the description related to FIG. 5, consider a receiving device that receives four signal blocks as described with respect to FIG. 4 above. Also consider that these blocks are split into two parts (e.g., $\mathcal{H}^{(1)}$ and $\mathcal{H}^{(2)}$).

Given that the option depicted in 402(c) (of FIG. 4 above) is adopted, the data symbols can be arranged as:

$$X^{(1)} = [x^{(1)} \ x^{(2)}]$$
$$= \begin{bmatrix} P_1^{(1)} & x_1^{(2)} \\ x_2^{(1)} & x_2^{(2)} \end{bmatrix}$$
$$X^{(2)} = [x^{(3)} \ x^{(4)}]$$
$$= \begin{bmatrix} x_1^{(3)} & x_1^{(4)} \\ x_2^{(3)} & P_2^{(4)} \end{bmatrix}$$

The matrices are arranged as shown in FIG. 5 where $H^{(1)} = H^{(2)} = \mathcal{H}^{(1)}$, and $H^{(3)} = H^{(4)} = \mathcal{H}^{(2)}$.

Based on extensive experimental results, the pilot symbols were chosen as $P_1 = j$ and $$P_2 = \frac{-1+j}{\sqrt{2}}.$$

The remaining processes is to substitute in for the equations related to $[\hat{H}^{(l)}, \hat{X}^{(l+1)}]$ described above (with respect to FIG. 3) and find the minimum.

Figure 6:
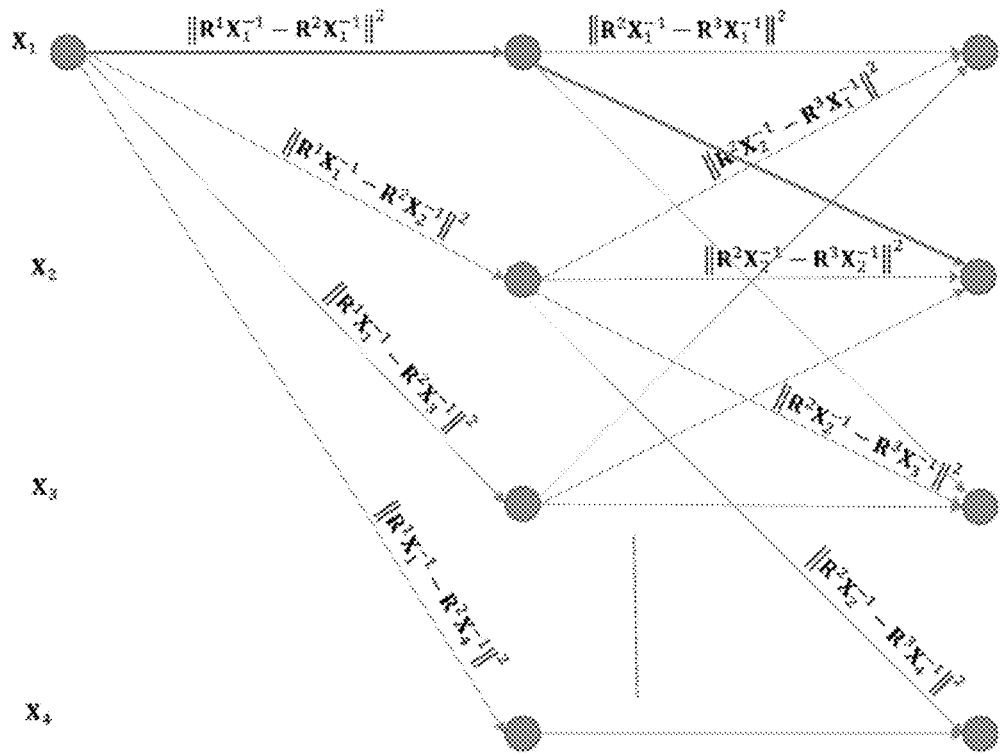
FIG. 6 depicts an illustration of some example techniques by which embodiments described herein may be optimized in accordance with at least some embodiments.

FIG. 6 depicts an illustration of some example techniques by which embodiments described herein may be optimized in accordance with at least some embodiments. In particular, the technique involves the re-use of previously detected matrices in order to reduce future computational requirements.

Given that the number of trial matrices is K, $\tilde{X}^{(1)} \ldots, \tilde{X}^{(K)}$, the number of information symbols in each of them is q, and the modulation order is M, then the number of times the objective function for the D3 receiver $$\left( \text{i.e., } \arg\min_{[\tilde{X}_{(l)}, \tilde{X}_{(l+1)}]} \sum_{i=1}^{N} \sum_{j=1}^{N} |Q^{(l)}(i,j) - Q^{(l+1)}(i,j)|^2 \right)$$

should be evaluated is $K^{qM}$. For the case of the example illustrated in FIGS. 4 and 5, K=3, M=2, q=3, and hence the total number of times the operation $\|R^{(l)} \times [\tilde{X}^{(l)}]^{-1} - R^{(l+1)} \times [\tilde{X}^{(l+1)}]^{-1}\|^2$ will be computed is $3^6 = 729$ times. Because the dimensions of the R and X matrices are generally small, the computational complexity of the objective function core is reasonable. However, for large values of K, the complexity becomes quite high. Therefore, a suboptimal approach could be proposed by noting that the term $R^{(l+1)} \times [\tilde{X}^{(l+1)}]^{-1}$ is used twice at each step. For example, assume that K=3 in the objective function for the D3 receiver. The objective function then becomes $$\|R^{(1)} \times [\tilde{X}^{(1)}]^{-1} - R^{(2)} \times [\tilde{X}^{(2)}]^{-1}\|^2 + \|R^{(2)} \times [\tilde{X}^{(2)}]^{-1} - R^{(3)} \times [\tilde{X}^{(3)}]^{-1}\|^2 \quad (18)$$

Thus, the term $R^{(2)} \times [\tilde{X}^{(2)}]^{-1}$ would be used twice. Therefore, in order to reduce the complexity of at least some embodiments, the suboptimal detector can detect the matrices $X^{(1)} \ldots X^{(K)}$ sequentially. Hence, FIG. 6 shows the sequential detection process for a system with q=3 assuming that the last detected matrix is $X_1^{(1)}$. As can be noted from the figure, the system is required to compute the above only 8 times to proceed from one state to the next one, which is much less complex than performing 64 operations at each stage.

Figure 7:
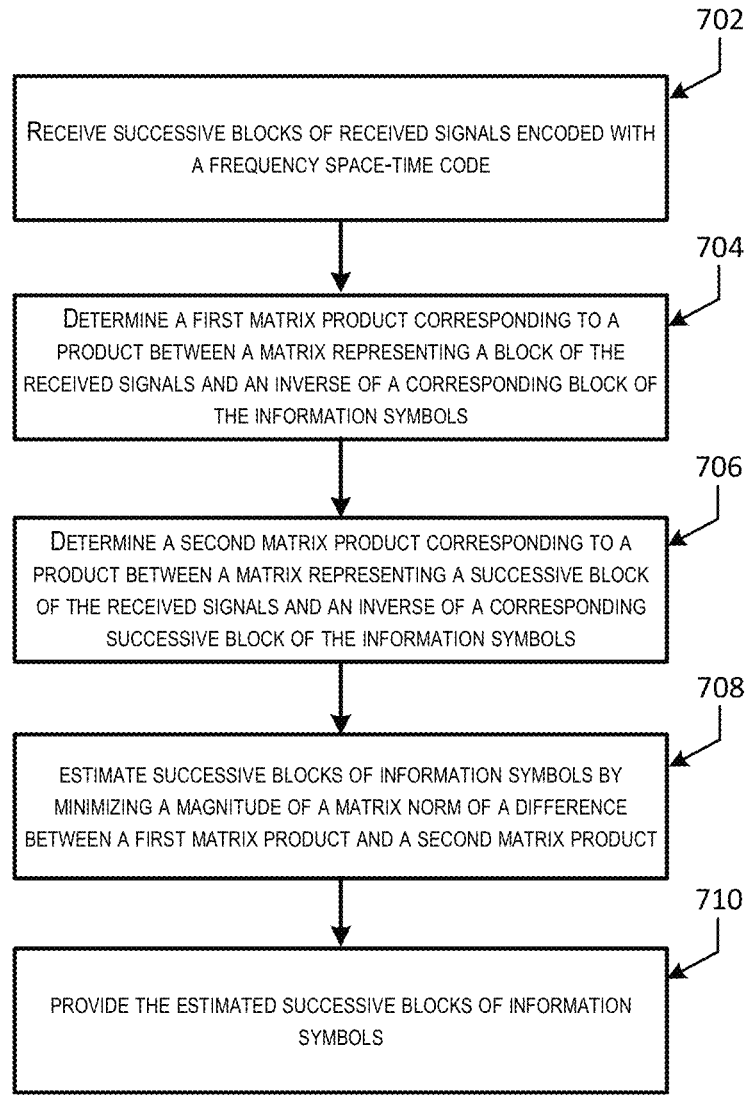
FIG. 7 depicts a flow diagram illustrating an example process for exacting information from a noisy multiple-input multiple-output (MIMO) wireless communication channel in accordance with at least some embodiments.

FIG. 7 depicts a flow diagram illustrating an example process for exacting information from a noisy multiple-input multiple-output (MIMO) wireless communication channel in accordance with at least some embodiments. The process 700 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 700 (or any other processes described herein, or variations and/or combinations thereof) may be performed under the control of one or more processing devices configured with executable instructions and may be implemented as code (e.g., executable instructions, one or more computer programs or one or more applications). In accordance with at least one embodiment, the process 700 of FIG. 7 may be performed by at least the one or more receiving device 106 depicted in FIG. 1. The code may be stored on a computer-readable storage medium, for example, in the form of a computer program including a plurality of instructions executable by one or more processors. The computer-readable storage medium may be non-transitory.

Process 700 may begin at 702, when a receiving device receives successive blocks of signals encoded with a space-time code. The blocks of signals may include signals transmitted by multiple antennas. The blocks of signals may be successive in that one block of signals is received preceding or subsequent to the receipt of a second block of signals. In some embodiments, the blocks of signals may include some overlap.

At 704, the process may involve determining a first matrix product corresponding to a product between a matrix representing a block of the received signals and an inverse of a corresponding block of the information symbols. As described in greater detail above, this may involve the calculation of $R^{(l)} \times [\tilde{X}^{(l)}]^{-1}$ for a particular block of signals.

At 706, the process may involve determining a second matrix product corresponding to a product between a matrix representing a successive block of the received signals and an inverse of a corresponding successive block of the information symbols. As described in greater detail above, this may involve the calculation of $R^{(l+1)} \times [\tilde{X}^{(l+1)}]^{-1}$ for a block of signals successive to the block of signals processed at 704.

At 708, the process may involve estimating successive blocks of information symbols. In some embodiments, this may be done by minimizing a magnitude of a matrix norm of a difference between the determined first matrix product and the determined second matrix product. As described in greater detail above, this may involve the identification of a minimum $$\left(\text{e.g., arg} \min_{[\tilde{X}^{(l)}, \tilde{X}^{(l+1)}]}\right)$$

for the difference of the two matrix products determined at steps 704 and 706. In other words the process may involve, for at least two successive blocks of signals, the calculation of:

$$\arg \min_{[\tilde{X}^{(l)}, \tilde{X}^{(l+1)}]} \left\| R^{(l)} \times [\tilde{X}^{(l)}]^{-1} - R^{(l+1)} \times [\tilde{X}^{(l+1)}]^{-1} \right\|^2.$$

In some embodiments, the process at 708 may involve minimizing a sum of a magnitude of a matrix determinant of a difference between the determined first matrix product and the determined second matrix product. In other words the process may involve, for at least two successive blocks of signals, the calculation of:

$$\arg \min_{[\tilde{X}^{(l)}, \tilde{X}^{(K)}]} \sum_{l=1}^{K-1} \left\| R^{(l)} \times [\tilde{X}^{(l)}]^{-1} - R^{(l+1)} \times [\tilde{X}^{(l+1)}]^{-1} \right\|^2$$

At 710, the process may involve providing the estimated successive blocks of information symbols to some consumer of such information symbols. In some embodiments, the information symbols may be provided in a message format. For example, a receiving device that exacts the information symbols in the above process may translate those exacted symbols into a message.

FIGS. 8-13 each depict graphical representations of performance metrics achieved in experiments conducted. Extensive Monte Carlo simulation experiments were performed to evaluate the performance of the new system. The OFDM system and pilot arrangement follows the LTE design shown in FIG. 3. For these experiments, the sampling frequency was set to 3.836 MHz, N=512 subcarriers, NCP=64 samples. The pilot symbols power in LTE might be transmitted at three different power levels relative to the information symbols power levels, namely, no boost, 3 dB boost, or 6 dB boost. In the results, D3 double pilot corresponds to option 402(b) depicted in FIG. 4 while $D^3$ single pilot corresponds to option 402(c) depicted in FIG. 4. For fair comparison among all systems, the total pilot power for all systems was set to be equal. The MIMO system used is the 2×2 V-Blast where all channels are mutually independent.

For the conventional systems, the channel estimates are obtained using LSE using the plot symbols, then linear or spline interpolation are used to obtain the channel estimates for all other data symbols. The obtained channel estimates are then used to equalize and detect the information symbols using ZF or MMSE equalizers. Two channel models are considered to evaluate the performance of the new system in different operating conditions. The first is the flat Rayleigh channel where all subcarriers undergo the same fading effects. The second is the frequency selective multipath channel follows the typical urban (TU) model [24], which corresponds to a moderate frequency-selective channel having 6 taps with normalized delays of [0, 2, 3, 9, 13, 29] samples and average dB-gains of [−3, 0, −2, −6, −8, −10]. In each simulation run, 106 OFDM symbols are generated. For all the configurations used, the total power allocated to all pilot symbols is equal for fair comparison among different configurations.

Figure 8:
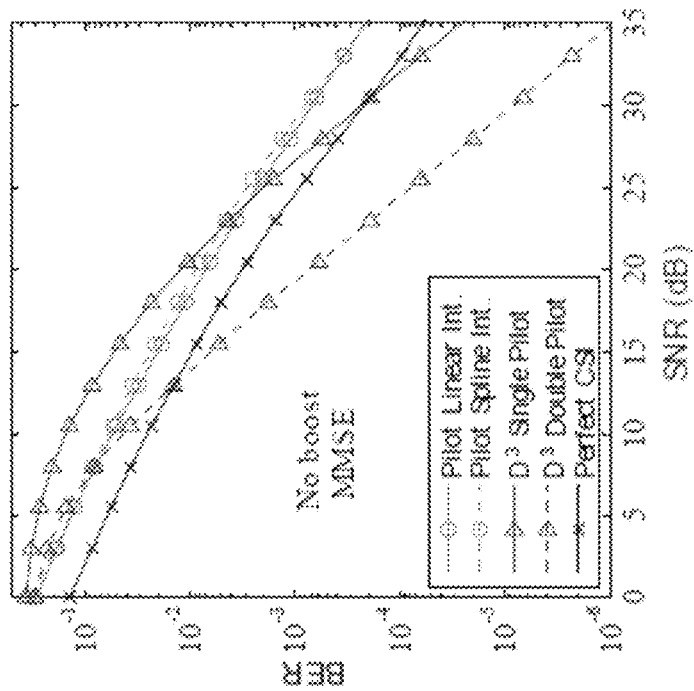
FIG. 8 depicts graphical representations of performance metrics achieved in comparison to both ZF both MMSE equalizers using no boost and with a flat fading channel.
Figure 8:
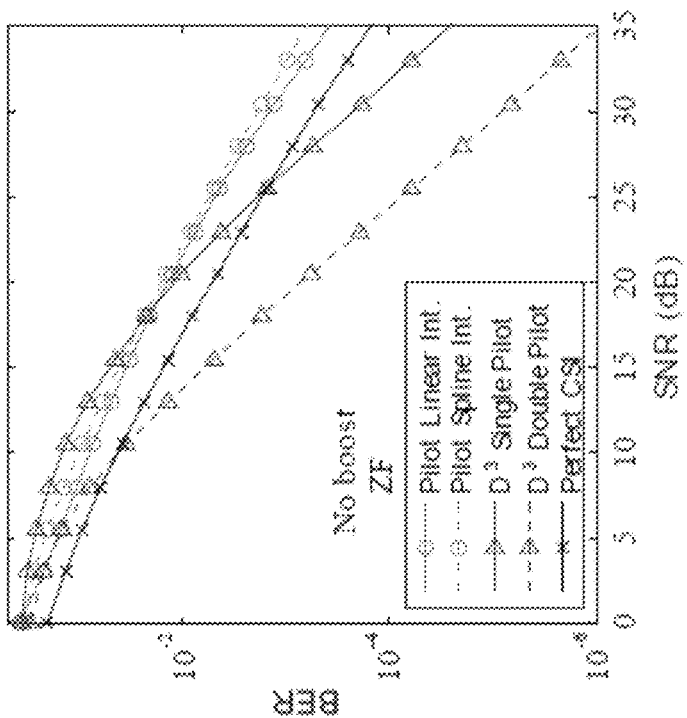

FIG. 8 depicts graphical representations of performance metrics achieved in comparison to both ZF both MMSE equalizers using no boost and with a flat fading channel.

Figure 9:
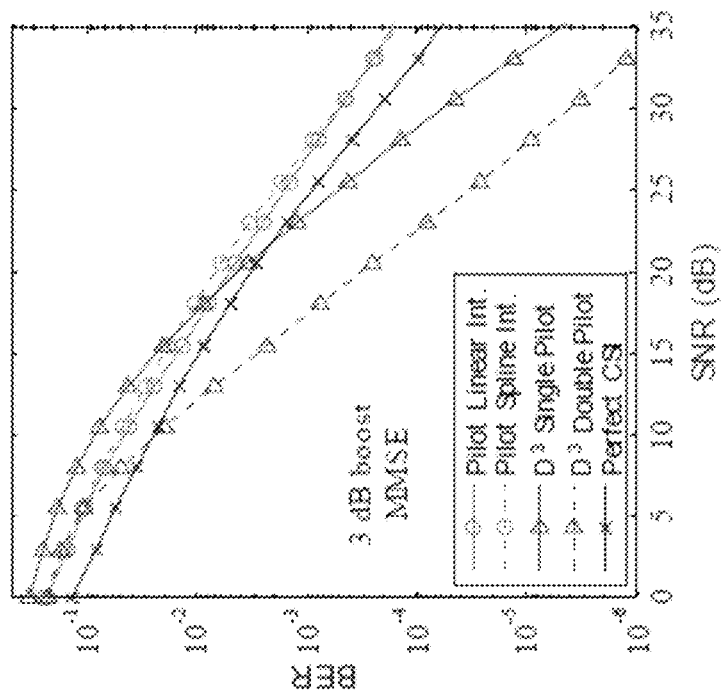
FIG. 9 depicts graphical representations of performance metrics achieved in comparison to both ZF both MMSE equalizers using a 3 dB boost and with a flat fading channel.
Figure 9:
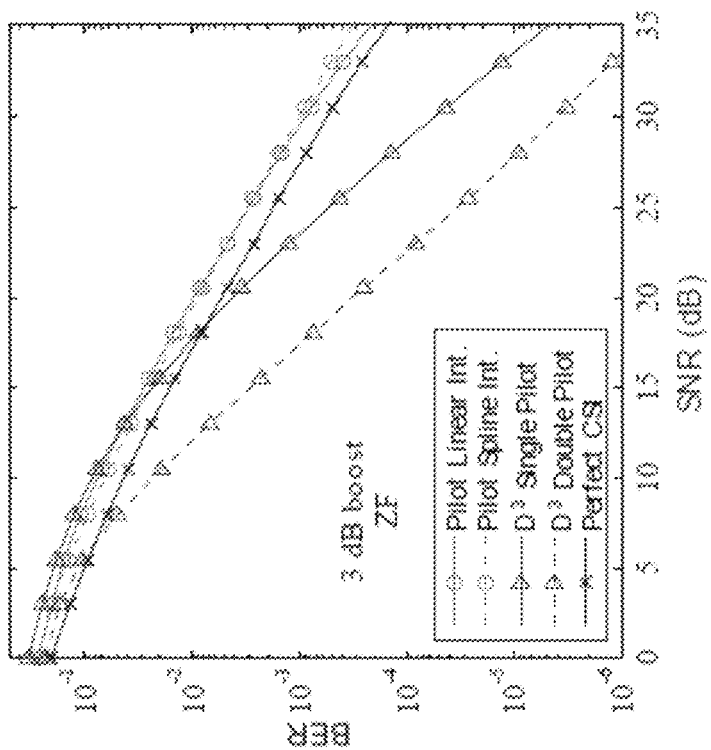

FIG. 9 depicts graphical representations of performance metrics achieved in comparison to both ZF both MMSE equalizers using a 3 dB boost and with a flat fading channel.

Figure 10:
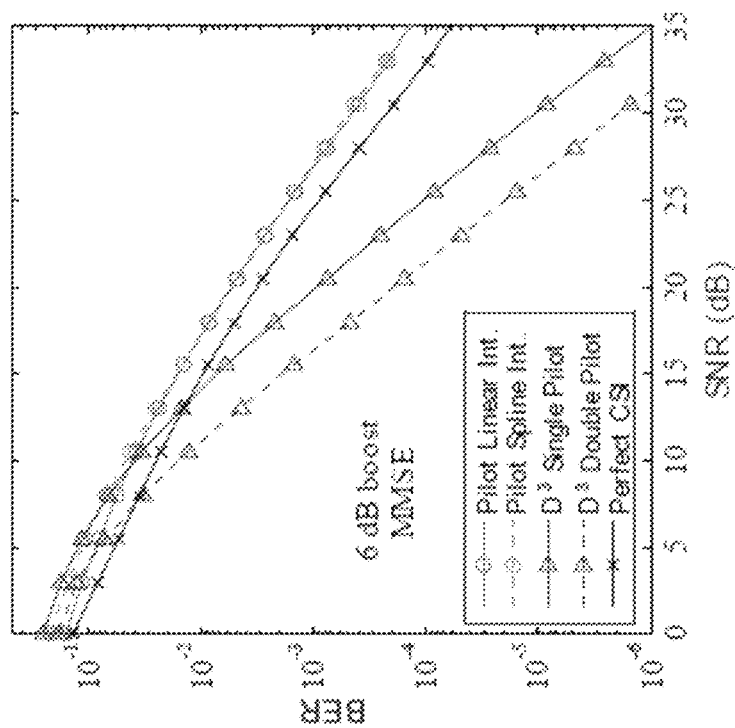
FIG. 10 depicts graphical representations of performance metrics achieved in comparison to both ZF both MMSE equalizers using a 6 dB boost and with a flat fading channel.
Figure 10:
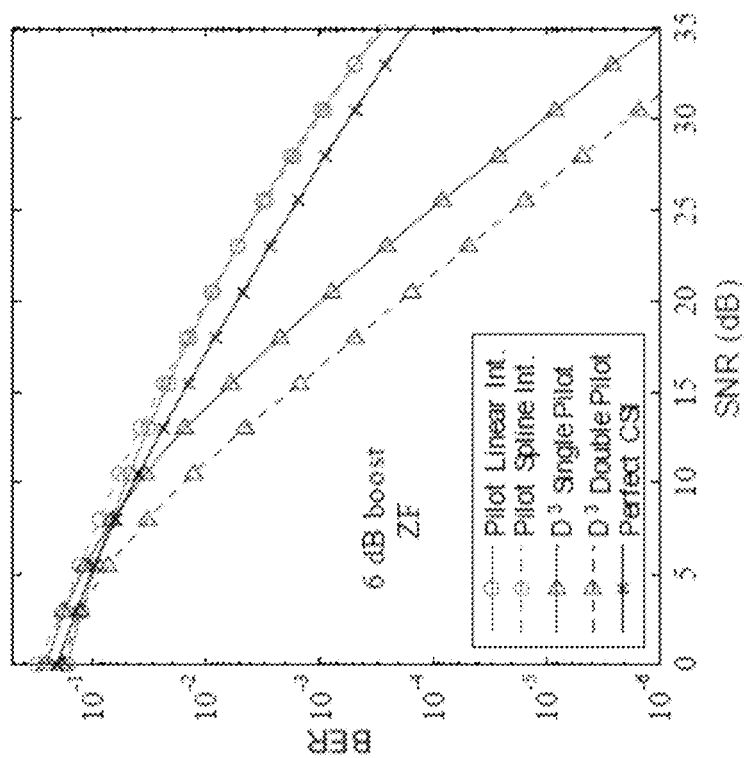

FIG. 10 depicts graphical representations of performance metrics achieved in comparison to both ZF both MMSE equalizers using a 6 dB boost and with a flat fading channel.

Figure 11:
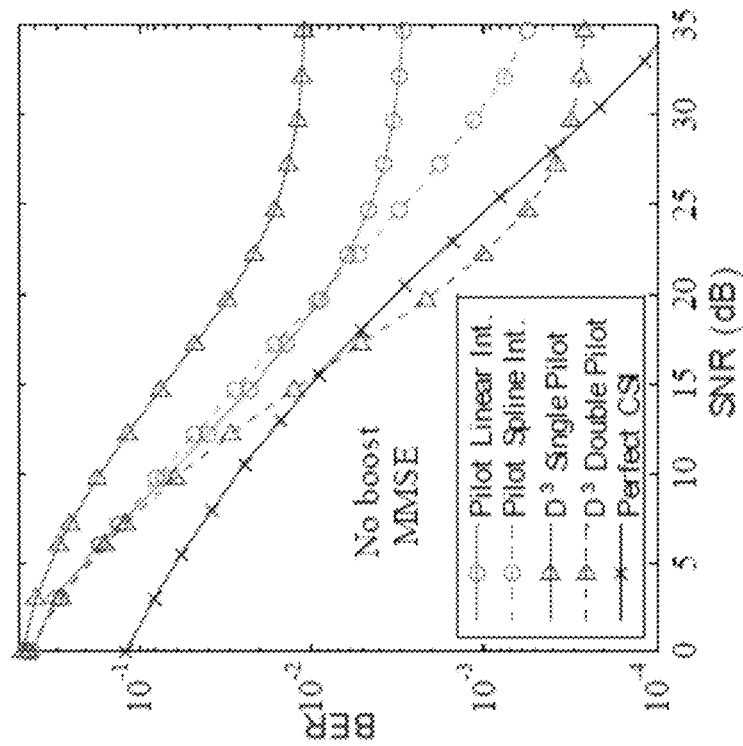
FIG. 11 depicts graphical representations of performance metrics achieved in comparison to both ZF both MMSE equalizers using no boost and with a frequency selective channel.
Figure 11:
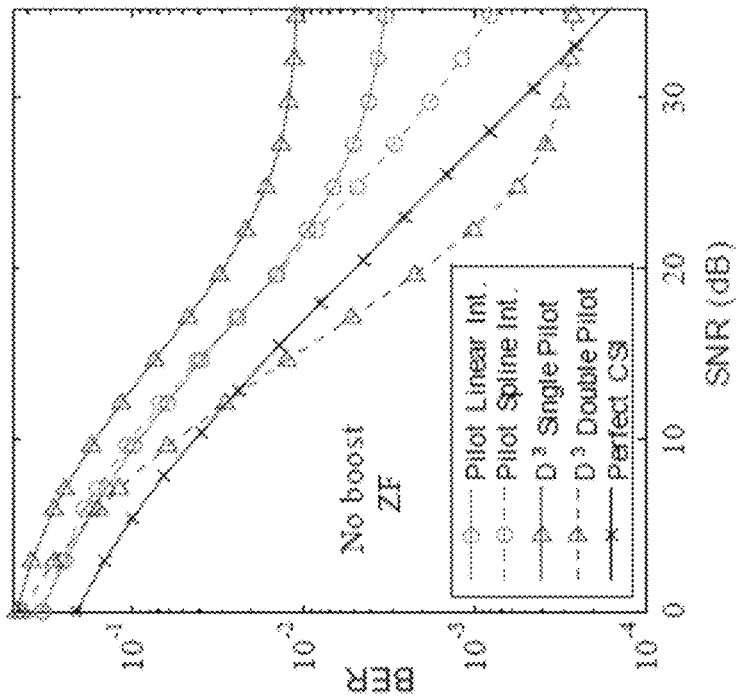

FIG. 11 depicts graphical representations of performance metrics achieved in comparison to both ZF both MMSE equalizers using no boost and with a frequency selective channel.

Figure 12:
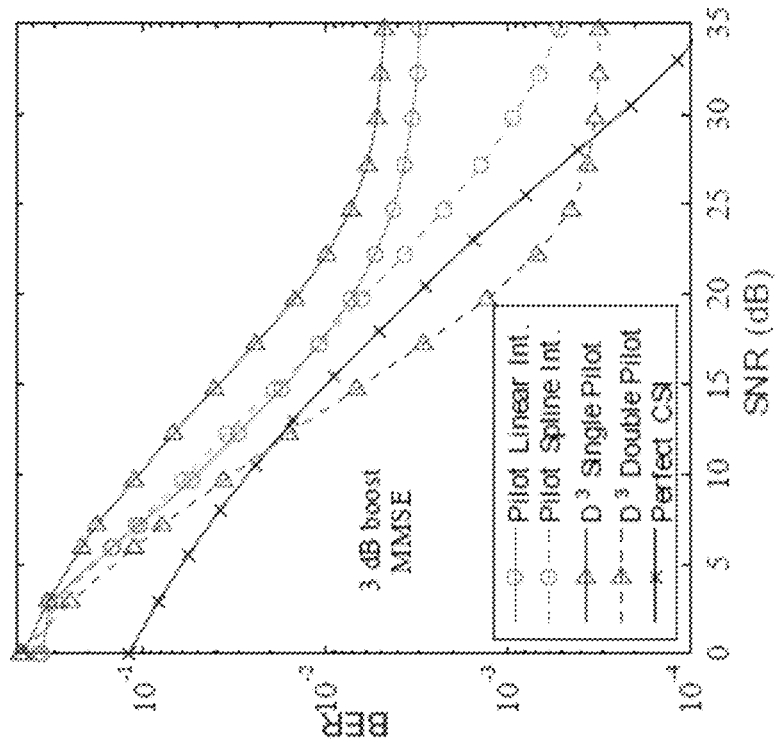
FIG. 12 depicts graphical representations of performance metrics achieved in comparison to both ZF both MMSE equalizers using a 3 dB boost and with a frequency selective channel.
Figure 12:
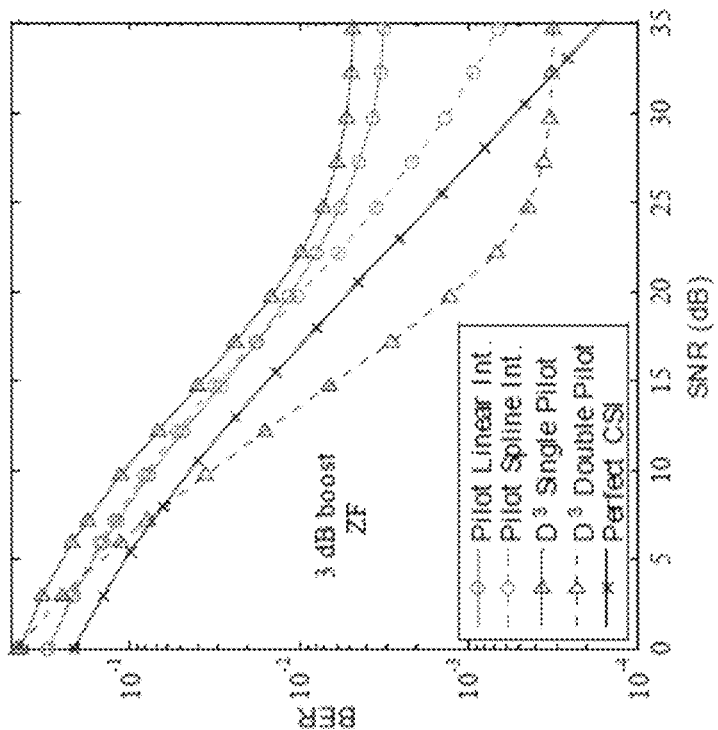

FIG. 12 depicts graphical representations of performance metrics achieved in comparison to both ZF both MMSE equalizers using a 3 dB boost and with a frequency selective channel.

Figure 13:
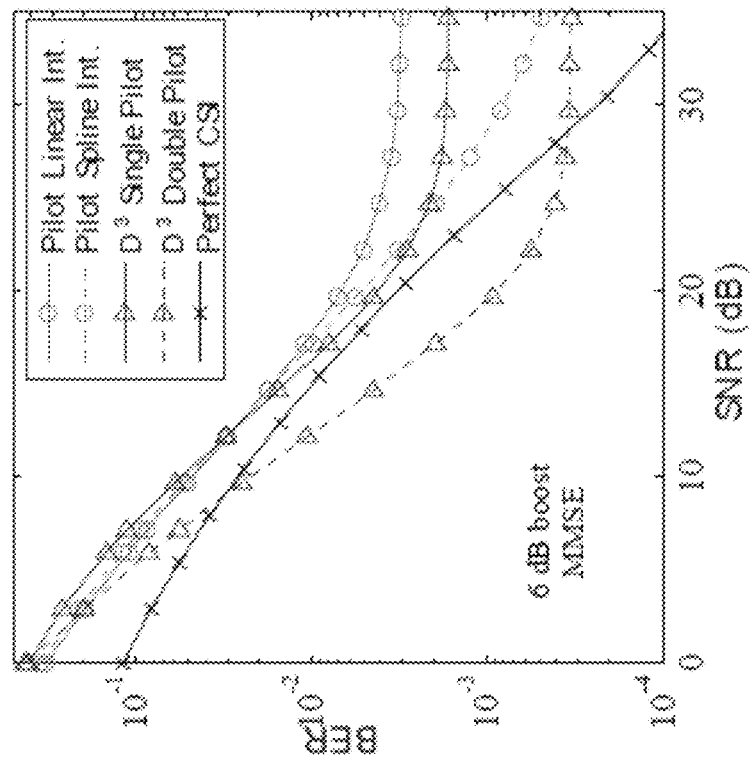
FIG. 13 depicts graphical representations of performance metrics achieved in comparison to both ZF both MMSE equalizers using a 6 dB boost and with a frequency selective channel.
Figure 13:
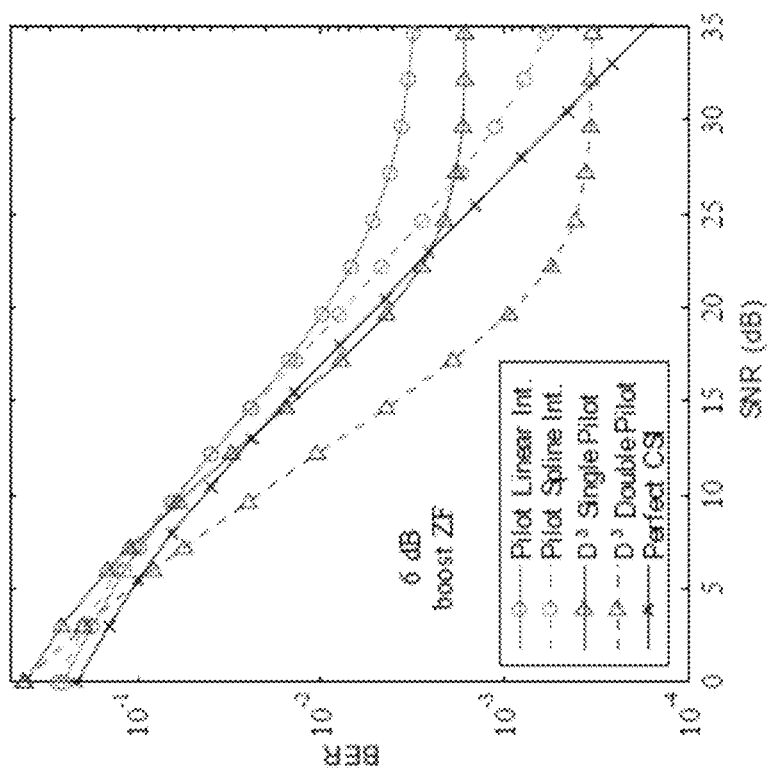

FIG. 13 depicts graphical representations of performance metrics achieved in comparison to both ZF both MMSE equalizers using a 6 dB boost and with a frequency selective channel.

The BER performance of the proposed system in flat and frequency selective fading channels is shown in FIGS. 8-13 for different pilot configurations using the proposed system as well as the ZF and MMSE equalizer. The results are also presented for the case with perfect channel estimates for all subcarriers. For the conventional system with channel estimation, the channel matrix H is estimated at the pilot locations using LSE, and then either linear or spline interpolation is used to find the channel estimates at other non-pilot symbols. In the LTE-A standard, the pilot symbols can be transmitted using three different power levels, no boost (pilot power is equal to data symbols power), 3 dB boost, or 6 dB boost.

Each of FIGS. 8-10 considers the case of flat fading channels with all possible combinations of boosting and pilot mapping. As it can be noted from the figures, the proposed system can offer substantial BER improvement over conventional systems even with perfect channel estimates. In particular for the option 402(b) depicted in FIG. 4 and with 6 dB boost, where the BER improvement is about 15 dB at BER=$10^{-4}$. For this case, the spectral efficiency of the proposed and conventional systems is equal. For option 402(c) depicted in FIG. 4, the proposed system has better spectral efficiency because the nulled subcarriers are replaced by regular data symbols.

While the spectral efficiency (ratio of data subcarriers divided by total subcarriers) for the considered 2×2 conventional system is 75%, it is actually 87.5% for the proposed system, i.e., 16.6% higher than the conventional system. The BER for the single pilot case is highly dependent on the boosting value used. For the 6 dB case, the new system provides both BER and spectral efficiencies significantly higher than conventional systems. It is also worth noting the MMSE requires the knowledge of noise variance $\sigma_z^2$.

It should be noted that FIGS. 11-13 are similar to FIGS. 8-10 except that the channel is frequency selective due to the multipath fading process, as opposed to a flat fading channel. Generally speaking, the same trends observed for the flat channel (FIGS. 8-10) have been observed for the frequency-selective fading case (FIGS. 11-13). However, all the considered systems suffer from error floors due to the severe fading inherent to frequency-selective channels. Nevertheless, the proposed system remains superior for various configurations and channel conditions.

The various embodiments described herein can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a MIMO communication system.

A system capable of implementing embodiments herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

Embodiments of the invention may be implemented partially or entirely in hardware, for example, with one or more circuits such as electronic circuits, optical circuits, analog circuits, digital circuits, integrated circuits ("IC", sometimes called a "chip") including application-specific ICs ("ASICs") and field-programmable gate arrays ("FPGAs"), and suitable combinations thereof. As will be apparent to one of skill in the art, notions of computational complexity and computational efficiency may be applied mutatis mutandis to circuits and/or circuitry that implement computations and/or algorithms. Based on the disclosure and teachings provided herein, a person of ordinary skill in the art will know and appreciate other ways and/or methods to implement the present invention using hardware and/or a combination of hardware and software.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method for exacting information from a noisy multiple-input multiple-output (MIMO) wireless communication channel, the method comprising:
    receiving, with one or more antennas, successive blocks of received signals encoded with a frequency space-time code, each block of received signals corresponding to a transmitted block of information symbols and perturbed by noise;
    jointly estimating successive blocks of information symbols at least in part by minimizing a magnitude of a matrix norm of a difference between a first matrix product and a second matrix product, the first matrix product corresponding to a product between a matrix representing a block of the received signals and an inverse of a corresponding block of the information symbols, the second matrix product corresponding to a product between a matrix representing a successive block of the received signals and an inverse of a corresponding successive block of the information symbols; and
    providing the estimated successive blocks of information symbols to a consumer of information symbols.

2. The method of claim 1, wherein minimizing the magnitude of the matrix norm of the difference between the first matrix product and the second matrix product comprises determining matrices representing the successive blocks of information symbols such that the magnitude of the matrix norm of the difference between the first matrix product and the second matrix product is minimized.

3. The method of claim 1, wherein successive blocks of received signals comprises two consecutive blocks of signals received by a receiving device.

4. The method of claim 1, wherein the successive blocks of received signals are received via a frequency selective channel.

5. The method of claim 1, wherein the successive blocks of received signals are received via a flat fading channel.

6. A method for exacting information from a noisy multiple-input multiple-output (MIMO) wireless communication channel, the method comprising:
    receiving, with one or more antennas, successive blocks of received signals encoded with a frequency space-time code, each block of received signals corresponding to a transmitted block of information symbols and perturbed by noise;
    jointly estimating successive blocks of information symbols at least in part by minimizing a sum of a magnitude of a matrix determinant of a difference between a first matrix and a second matrix, the first matrix based on a matrix representing a block of the received signals and an inverse of a corresponding block of the information symbols, the second matrix based on a matrix presenting a successive block of the received signals and an inverse of a corresponding successive block of the information symbols; and
    providing the estimated successive blocks of information symbols to a consumer of information symbols.

7. The method of claim 6, wherein the successive blocks of received signals comprises one or more pilot signals.

8. The method of claim 7, wherein the pilot signals correspond to one or more pilot symbols chosen such that the one or more pilot symbols are not included in alphabet of symbols available for the information symbols.

9. The method of claim 7, wherein the blocks of received signals comprises one or more information signals transmitted concurrently with the one or more pilot signals.

10. The method of claim 9, wherein the one or more information signals is transmitted by a different antenna than the one or more pilot signals.

11. The method of claim 6, wherein each of the successive blocks of received signals comprises a number of signaling periods which is greater than or equal to a number of the one or more antennas.

12. The method of claim 6, wherein a size of at least the first matrix is based at least in part on a number of the one or more antennas.

13. The method of claim 12, wherein the size of at least the first matrix is also based at least in part on a second number of antennas of a transmitting device from which the successive blocks of received signals have been received.

14. A receiving device comprising:
one or more antennas; and
a signal detector for exacting information from a noisy multiple-input multiple-output (MIMO) wireless communication channel, the signal detector being adapted to:
  receive, via the one or more antennas, successive blocks of received signals encoded with a frequency space-time code, each block of received signals corresponding to a transmitted block of information symbols and perturbed by noise;
  determine a first matrix based on a matrix representing a block of the received signals and an inverse of a corresponding block of the information symbols;
  determine a second matrix based on a matrix presenting a successive block of the received signals and an inverse of a corresponding successive block of the information symbols;
  estimate successive blocks of information symbols based at least in part on a difference between the determined first matrix and the determined second matrix; and
  provide the estimated successive blocks of information symbols to a second device.

15. The receiving device of claim 14, wherein the signal detector is further adapted to estimate information symbols that were transmitted concurrently with pilot signals.

16. The receiving device of claim 14, wherein the signal detector is adapted to receive successive blocks of signals over a frequency selective channel.

17. The receiving device of claim 14, wherein the signal detector is adapted to receive successive blocks of signals over a flat fading channel.

* * * * *